(12) United States Patent
Ha

(10) Patent No.: US 8,706,149 B2
(45) Date of Patent: Apr. 22, 2014

(54) METHOD FOR ALLOCATING PRIORITY TO RESOURCE AND METHOD AND APPARATUS FOR OPERATING RESOURCE USING THE SAME

(75) Inventor: Jeoung Lak Ha, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 641 days.

(21) Appl. No.: 12/987,580

(22) Filed: Jan. 10, 2011

(65) Prior Publication Data

US 2011/0283287 A1   Nov. 17, 2011

(30) Foreign Application Priority Data

May 17, 2010   (KR) ........................ 10-2010-0045940

(51) Int. Cl.
*H04B 7/00*   (2006.01)

(52) U.S. Cl.
USPC ..... 455/512; 455/450; 455/452.1; 455/452.2; 455/509; 370/329

(58) Field of Classification Search
USPC ................ 455/450–452.2, 509–513; 370/329
See application file for complete search history.

(56) References Cited

U.S. PATENT DOCUMENTS

2008/0089281 A1   4/2008   Yoon et al.

FOREIGN PATENT DOCUMENTS

KR   10-2009-0030299   3/2009

OTHER PUBLICATIONS

"Efficient Spectrum Matching Based on Spectrum Characteristics in Cognitive Radio Systems", Ohyun Jo, Dong-Ho Cho, IEEE Wireless Telecommunications Symposium, Apr. 2008.

*Primary Examiner* — Raymond Dean
(74) *Attorney, Agent, or Firm* — Staas & Halsey LLP

(57) ABSTRACT

Disclosed are a method for allocating priority to resources, and a method and apparatus for operating resources using the same. The method for allocating priority to resources includes: selecting a resource block including at least one unit; determining a priority level of the selected resource block by reflecting a retrieval rate (or recovery rate) including a retrieval frequency and a retrieval period of the selected resource block; and allotting the determined priority level to the selected resource block.

17 Claims, 14 Drawing Sheets

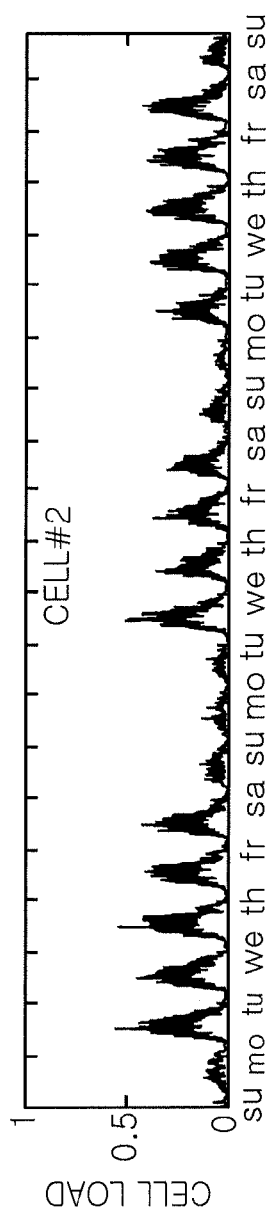
CELL #2
PRIOR ART
FIG. 2
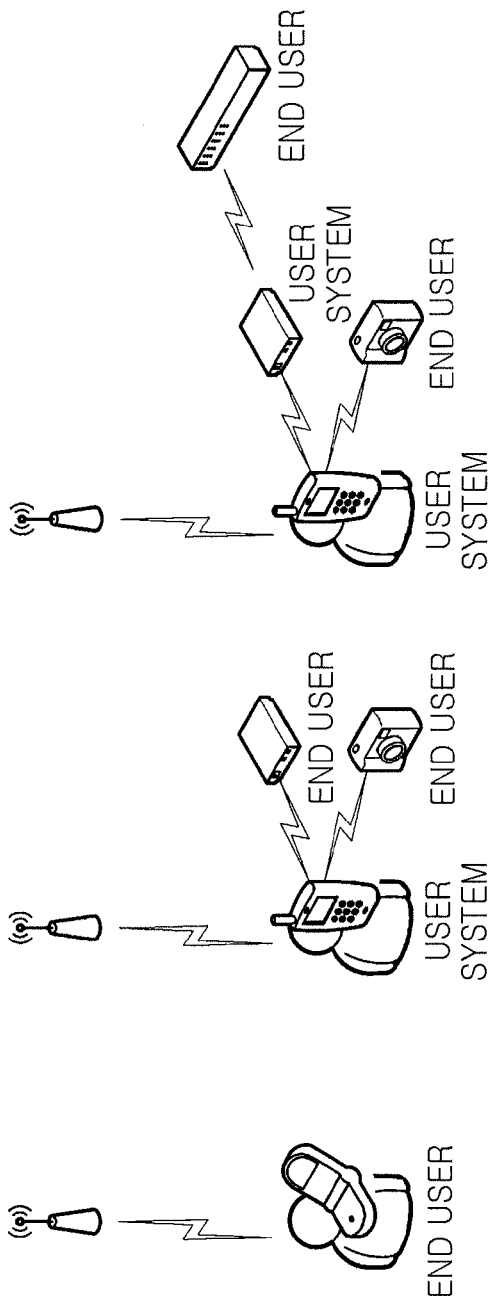
PRIOR ART
FIG. 3A
PRIOR ART
FIG. 3B
PRIOR ART
FIG. 3C

METHOD FOR ALLOCATING PRIORITY TO RESOURCE AND METHOD AND APPARATUS FOR OPERATING RESOURCE USING THE SAME

CROSS-REFERENCE TO RELATED APPLICATIONS

This application claims the priority of Korean Patent Application No. 10-2010-0045940 filed on May 17, 2010, in the Korean Intellectual Property Office, the disclosure of which is incorporated herein by reference.

BACKGROUND OF THE INVENTION

1. Field of Invention

The present invention relates to a method for allocating priority to a resource and a method and apparatus for operating a resource using the same, and more particularly, to a method for allocating priority to resources to thus increase a duration in which a service uses resources, and a method and apparatus for operating resources using the same.

2. Description of the Related Art

Research has been actively conducted to apply priority to users in their occupying or acquiring resources to allow a user of higher priority to use a greater amount of limited resources; however, a method for effectively utilizing the characteristics of resources when a single system operates two or more resources, each having different characteristics, in an environment in which users share one or more radio resources has been overlooked.

SUMMARY OF THE INVENTION

An aspect of the present invention provides a method for allocating priority to resources to thereby lengthen a duration in which a service uses resource.

Another aspect of the present invention provides a method and apparatus for operating resources by using a method for allocating priority to resources to lengthen duration in which a service uses resources.

According to an aspect of the present invention, there is provided a method for allocating priority to resources, including: selecting a resource block including at least one unit; determining a priority level of the selected resource block by reflecting (or in consideration of or according to) a retrieval rate (or recovery rate) including a retrieval frequency and a retrieval period of the selected resource block; and allotting the determined priority level to the selected resource block.

The resource block may be a spectrum block of radio communication.

The priority level may be dynamically changed.

In determining the priority level of the selected resource block, each of a plurality of units constituting the selected resource block may have a different priority level.

The priority level determined for each unit may be determined by reflecting an expectation value of a retrieval rate of the selected resource block.

In determining the priority level to the resource block, the priority level may be determined by reflecting at least one of an expectation value of a retrieval rate of the selected resource block and the probability that retrieval of the selected resource block will be requested.

According to another aspect of the present invention, there is provided a method for operating resources, including: selecting a resource block including at least one unit, determining a priority level of the selected resource block by reflecting a retrieval rate (or recovery rate) including a retrieval frequency and a retrieval period of the selected resource block, and allotting the determined priority level to the selected resource block, thereby allocating the priority level to the resource block; distributing the priority level-allocated resource block to a service which is to use the resource block; and retrieving the resource block which has been distributed to the service.

In allocating the priority level of the selected resource block, each of a plurality of units constituting the selected resource block may have a different priority level.

The priority level determined for each unit may be determined by reflecting an expectation value of a retrieval rate of the selected resource block.

In allocating the priority level to the resource block, the priority level may be allotted by reflecting at least one of an expectation value of a retrieval rate of the selected resource block, the probability that retrieval of the selected resource block will be requested, the amount of resource blocks remaining unused among the selected resource blocks which have been used, and the number of the selected resource blocks.

In distributing the priority level-allocated resource blocks to a service which is to use the resource blocks, the resource blocks may be distributed according to the QoS (Quality of Service) of the service.

In retrieving the resource blocks distributed to the service, when a requested retrieval amount of resource blocks is smaller than the amount of unused resources, the unused resources may be retrieved, and when the requested retrieval amount of resource blocks is greater than the amount of unused resources, the unused resources may be retrieved, resource corresponding to the difference between the requested retrieval amount of the resource blocks and the unused resources may be handed off, and a service of resource that cannot be handed off may be dropped.

In retrieving the resource blocks distributed to the service, resources used by the service may be handed off starting from a service of a low priority level to a service of a high priority level, and a service which is using resource that cannot be handed off may be dropped.

According to another aspect of the present invention, there is provided an apparatus for operating resources using a resource priority allocation method, including: a plurality of resource blocks including at least one unit; a plurality of services to use the plurality of resource blocks; a priority allocation unit determining a priority level of each of the resource blocks by reflecting a retrieval frequency and a retrieval period of each of the resource blocks and allotting the determined priority level to selected resource blocks, to thus allocate the priority level to the resource blocks; and a scheduler distributing the priority level-allocated resource blocks to the services and retrieving the priority level-allocated resource blocks from the services.

The scheduler may distribute the priority level-allocated resource blocks to the services and retrieve the priority level-allocated resource blocks from the services, according to the priority levels of the resource blocks.

The scheduler may distribute the priority level-allocated resource blocks to the services and retrieve the priority level-allocated resource blocks from the services, according to the QoS of the services.

In retrieving the resource blocks distributed to the services, when a requested retrieval amount of resource blocks is smaller than the amount of unused resources, the scheduler may retrieve the unused resources, and when the requested retrieval amount of resource blocks is greater than the amount of unused resources, the scheduler may retrieve the unused resources, and the scheduler may hand off resource corresponding to the difference between the requested retrieval amount of the resource blocks and the unused resources and drop a service of resource that cannot be handed off.

According to another aspect of the present invention, there is provided a method for operating resources, including: selecting resource blocks each including at least one unit and determining an operation probability of the selected blocks by reflecting a retrieval rate (or recovery rate) including a retrieval frequency and a retrieval period of the selected resource blocks; distributing the selected resource blocks to a user who is connected to the selected resource blocks to use the resource blocks or to a user who is to use the resource blocks, according to the determined operation probability; and retrieving the resource blocks distributed to the user.

The operation probability may be determined to be different for each of the units.

The operation probability may be dynamically changed according to a distribution state of the resource blocks distributed to the user.

BRIEF DESCRIPTION OF THE DRAWINGS

The above and other aspects, features and other advantages of the present invention will be more clearly understood from the following detailed description taken in conjunction with the accompanying drawings, in which:

FIG. 2 illustrates daily usage patterns in a cell of a cellular network in the United States;

FIGS. 3A to 3C illustrate cases in which a personal user performs call communication through a base station in a current mobile communication system;

DETAILED DESCRIPTION OF THE PREFERRED EMBODIMENT

Figure 1:
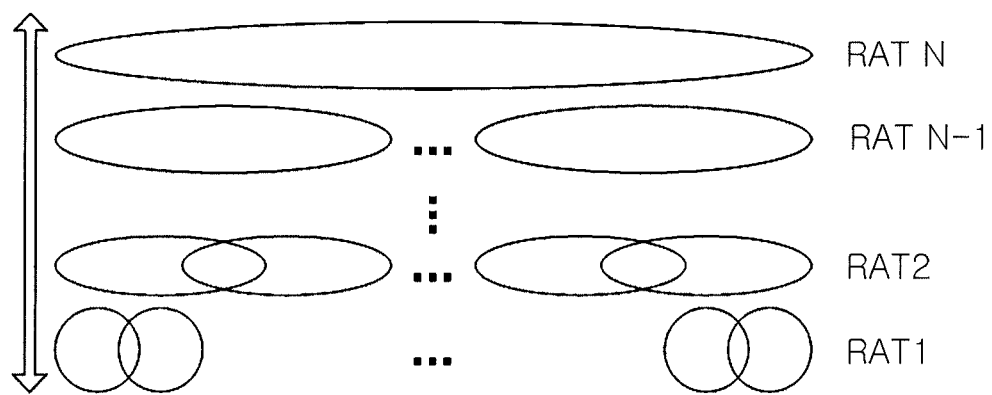
FIG. 1 illustrates one or more wireless communication systems existing in an area temporarily.

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

FIG. 1 illustrates one or more wireless communication systems existing in an area temporarily. As various radio access technologies (RATs) have been developed, various communication systems concurrently exist in one point in time or in a specific area. Namely, as shown in FIG. 1, one or more wireless communication systems exist temporarily. For example, diverse wireless networks, such as a wireless local area network (WLAN) of IEEE 802.11, WiBro of IEEE 802.16e, cdma2000, WCDMA, and the like, may concurrently exist.

WLAN uses an unlicensed band such as an ISM band, but in general, the use of frequency resources must be licensed by the relevant authorities. Pertinent frequency resources are distributed based on the hour of peak usage into which the most users crowd, so the usage of many frequencies is considerably low in most cases. In general, a usage rate of less than 15% is recorded.

FIG. 2 illustrates daily usage patterns in a cell of a cellular network in the United States (D. Willkomm, et al., "Primary User Behavior in Cellular Networks and Implications for Dynamic Spectrum Access," IEEE Communications Magazine, Vol. 47, No. 3, March 2009, pp. 88-95). With reference to FIG. 2, because resources are generally distributed based the hour of peak usage, it frequently happens that resources are scarcely used both temporally and spatially.

Thus, research into cognitive radio, dynamic radio resource allocation (Dynamic Spectrum Allocation, Dynamic Spectrum Access, Dynamic Spectrum Assignment, Spectrum Pooling), and the like, is actively ongoing as a method for increasing such a low frequency usage.

A future communication system might include, as aside from a primary user (PU) (or a primary system), a secondary user (SU) (or a secondary system) that uses frequency resources agreed upon by the PU or frequency resources the PU has opportunistically licensed, within a range in which the SU does not affect the PU, or in which the SU affects the PU minimally.

Here, the agreement by the PU refers to a case in which that the SU rents or leases pertinent frequency resources from the PU so as to be entitled to use the frequency resources. The use of resources opportunistically refers to a case in which the SU temporarily uses pertinent resources at a time or an area in which the PU does not use them and when the PU wants to use the pertinent resources, the SU immediately stops using the corresponding resources.

In the case of using the pertinent frequency resource upon the agreement of the PU, a certain period may be applied in which to rent or borrow the frequency resources, or the PU may request to temporarily retrieve the pertinent frequency resource from the SU as necessary, and in this case, a retrieval rate may be determined. The retrieval rate may vary depending on the terms of the agreement between the PU and the SU. In a state in which the PU secures the license to use (resources) for a certain period, the PU may re-lease it for a certain time slot during the corresponding period (by day, by hour, etc.) to make a profit. Or, at the time when a licensed owner of frequency vests the PU with the license to use, he may previously stipulate a certain level of PU's cooperation with the SU as the terms of vesting the PU with the license to use by law.

The above-described PU or SU is a concept in a broad sense, which can be subdivided to be described as follows. The foregoing PU and SU may be a user system or an end user.

FIGS. 3A to 3C illustrate cases in which a personal user (i.e., an individual) performs call communication through a base station in a current mobile communication system. With reference to FIGS. 3A to 3C, when a personal user performs call communication through a base station in a current mobile communication system, the personal user is an end user (See FIG. 3A); when the personal user constitutes a personal network to use an MP3, a camera, and the like, through the personal network for radio communication, the MP3, the camera, and the like, of the personal user would be an end user and the user terminal serving as a base station for them would be a user system (See FIG. 3B); and the user system and the end-user may reflexively (or recurrently), hierarchically continue to extend so as to be used (See FIG. 3C).

Namely, when the end-user and the user system are applied to the SU in the broadest sense (referred to as a 'broad SU', hereinafter) as described above, an SU in a narrow sense (referred to as a 'narrow SU', hereinafter) is a device as a secondary user and end-user, and the SS is a secondary user and user system. When the end-user and the user system are applied to the broad PU, a narrow PU is a device such as a primary user and end-user and the PS is a primary use and user system.

To help in understanding, for example, in a case employing this concept to the mobile communication system, the PS is a mobile communication base station and the PU is a mobile communication terminal. The SS is a secondary system that seeks an agreement to use frequency resource of mobile communication or intends to opportunistically use mobile communication frequency resources, and SU is an end-user that uses resources managed by the broad PU or SS, through the SS or directly by the SU itself.

FIGS. 4A to 4F illustrate how resources are shared among a primary system (PS), a secondary system (SS), a primary user (PU), and a secondary user (SU).

Figure 4A:
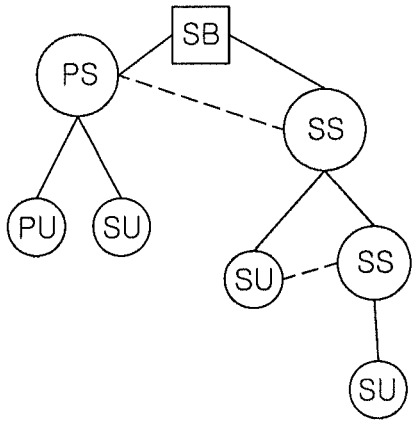
FIGS. 4A to 4F illustrate how resources are shared among a primary system (PS), a secondary system (SS), a primary user (PU), and a secondary user (SU)
Figure 4B:
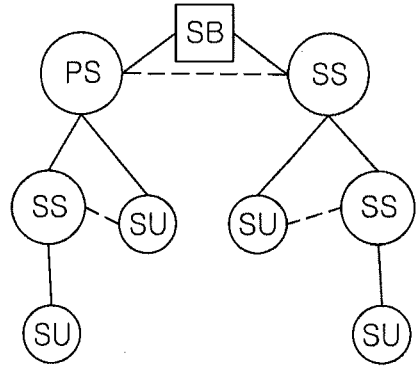

FIGS. 4A and 4B illustrate the use of a spectrum broker (SB). The SB is apprised of an operational situation of resources between the PS and the SS to recognize the resource operational situation and mediates to draw mutual agreement between the PS and the SS or between SSs on the resource operation so that the SS can use resource having low usage. Also, the PS or SS may directly report the resource operational situation to the SB, a device for monitoring the resource operational situation may monitor the resource operational situation and report it, or the broad PU and SU may cooperatively inform the SB of the resource operational situation.

In FIG. 4A, in a situation in which the PS is licensed to use certain resources, the SS seeks agreement on the use of the resources from the PS to acquire certain qualification for resources (i.e., the right to use resources) and the SS may allow a lower SS or SU to use its secured resources.

In FIG. 4B, when two or more SSs use common resources, without a specified PS, the SB can mediate the right to use resources between the SSs.

Figure 4C:
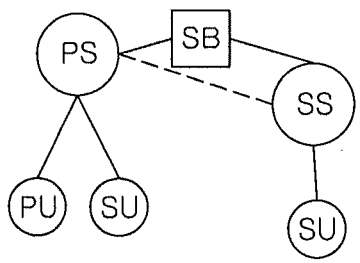
Figure 4D:
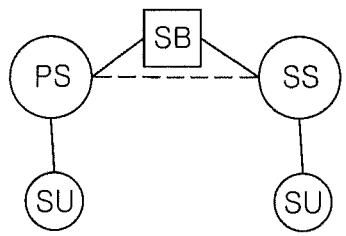

FIGS. 4C and 4D show the application of a radio enabler (RE) in the place of the SB. The RE informs the broad PU or SU of the operational situation of available resources. The RE may merely provide the collected operational situation of resources, rather than serving as a mediator, in order to help the PUs or SUs determine which resources they will use. The RE may collect the information regarding the operational situation of resources directly from the PS or SS, may be apprised by a separate device that monitors the operational situation of resources, or may be cooperatively informed by the broad PUs and SUs.

In FIG. 4C, in a situation in which the PS has the right to use resources and operates the resources, when the RE informs of the operational situation of the resources, the SS may seek agreement from the PS or may opportunistically use the resources.

In FIG. 4D, when two or more SSs use common resources, without a specified PS, the RE informs the SS of the operational situation of resources between the SSs, and the SSs seek mutual agreement or may operate resources with the right to use them.

In FIGS. 4A to 4D, the connections indicated by dotted lines may be applied according to a scenario or may not.

When a broad PU and SU or two SUs use resources upon agreement with each other, they can acquire the rights to use through a certain protocol along the dotted lines.

Figure 4E:
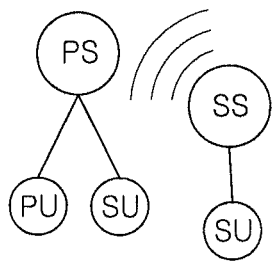
Figure 4F:
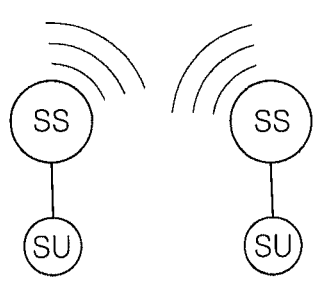

FIGS. 4E and 4F illustrate the cases in which the SSs directly search for certain frequency resources which are available as they are empty at a current location without help from the SB or RE.

In FIG. 4E, in a situation in which the PS has the rights to use certain resources, the SS senses that a portion or the entirety of the resources are not in use, so the SS uses the resources. In FIG. 4F, the SSs sense and use common resources or shared resources.

In FIGS. 4A, 4D, and 4E, the PS can support the SU according to circumstances. Namely, the PS may help the SU connected to the PS use the same resource as that used by the SS which has agreed to secondarily use the resources of the PS or opportunistically use the resources of the PS, or another resource the PS does not have the rights to use.

The cases illustrated in FIGS. 4A to 4F may be reflexively or recurrently configured, or may be configured to extend hierarchically. Besides the illustrated cases, there are numerous methods of using the resources by the PUs and SUs by seeking mutual agreement, or opportunistically, and the present invention is not limited to the cases of FIGS. 4A to 4F as scenarios of sharing the resources between the broad PU and SU and between SUs. That is, the cases in which the PU and the SU may be operated or used by the same corporate body or individual or may be operated or used by different corporate bodies or individuals.

Figure 5:
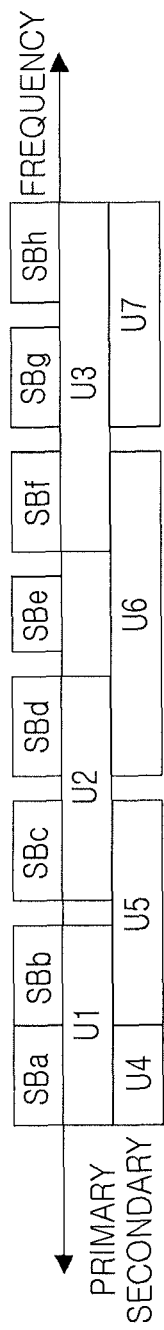
FIG. 5 illustrates a case in which a plurality of users (services) use two or more resources each having different characteristics.

FIG. 5 illustrates a case in which a plurality of users (services) use two or more resources, each having different characteristics. With reference to FIG. 5, in case in which the SUs use the frequency resources, which have been allocated to the PU, upon agreement with the PU or opportunistically, the SUs may share the frequency resources and the frequency resources may be two or more resources each having different characteristics.

As illustrated in FIG. 5, it is assumed that U1 is a primary user of SBa and SBb, UE is a primary user of SBc and SBd, U3 is a primary user of SBf, SBg, and SBh, U4 is a secondary user of SBa, and U5 is a secondary user of SBb and SBc. It is also assumed that U6 is a secondary user of SBd and SBf and a primary user of SBe, and U7 is a secondary user of SBg and SBh.

Here, each SB may be considered to be a single frequency assignment in the current mobile communication, or may be considered to be the magnitude of a certain frequency. For example, each SB may have a magnitude of 10 kHz or 10 MHz. This may be determined in consideration of the size of frequency blocks used both by the Pus and SUs. The size of SBs may vary, and the bandwidth unit (BU) may be used as a unit for the sake of convenience. When the BU is 1 Hz, it is a current unit representing a spectrum.

In this environment, for example, there are three resources of SBd, SBe, and SBf for U6. The issue of which of the three resources that can be used by the U6 is to be preferentially allocated is not a meaningful critical element in the related art.

However, in an environment of a cognitive radio system or a dynamic radio resource allocation, when the PU requests the retrieval of a portion or the entirety of pertinent resources, the SU must return the corresponding resources to the PU immediately or within a limited time.

Also, the sharing of resources by two or more PUs and SUs brings about various features according to the characteristics of the pertinent characteristics. For example, some resources are more expensive in their unit cost, or other resources have such good use characteristics that they can be more stably used. Consequently, the resources which are used make efficiency and performance differ, depending on the resource characteristics.

In FIG. 5, the user of U6 may use SBd, SBe, and SBf, but when U2 requests, the U6 must return SBd, and when U3 requests, U6 must return SBf. In this case, the return of the resources may cause an interruption of the service which has used the corresponding resources, so it is required to continue the service by using different resources. Also, if SBd has better use characteristics that those of SBf, greater use of SBd would help improve system performance.

When the resource, as mentioned above, is a radio spectrum, it is called a spectrum handoff, and the spectrum handoff is required to be minimized.

For example, in case of U6, when the user continuously enter and exit repeatedly and the three resources SBd, SBe, and SBf are randomly used, the probability that the user will be present in the respective SBd, SBe, and SBF will be proportional to the sizes of the SBd, SBe, and SBf.

In this case, when U2 requests the retrieval of a portion or the entirety of the resources of SBd, the user who uses SBd must be moved to SBf or SBe, and in this case, if the user cannot be moved, the service cannot be provided. Here, if the probability that U2 will use SBd is higher than the probability that U3 will use SBf, U6 may receive the users in the order, starting from SBe, SBf, and SBd in order to minimize handoff over the request of retrieval from U2 or U3.

In addition, when SBd has better use characteristics than those of SBf in a given environment (e.g., various environments such as in an indoor or outdoor area, during rain, in a city's downtown area, etc.), more use of SBd would help improve the system performance. In general, radio frequencies have different characteristics depending on their bands.

In this manner, the resources each having different characteristics are given a priority level, respectively, and are allocated for the service of the user according to the priority levels of the resources. Thus, although there is a change in a resource, the occurrence that the user of the resource is continuously provided with the service with a different resource can be minimized.

In a situation in which users continuously enter and exit a system, when the resources of the system are insufficient, the resources of a primary user may be borrowed to be used. The resources between the primary system and the secondary system may be utilized according to a procedure through a protocol upon payment after concluding an agreement in advance, or may be opportunistically used upon the agreement of the primary system. In this case, the influence of the secondary system on the primary system must be reduced to below a certain level.

The primary system and the secondary system may use resources together through various methods, and the primary system may request retrieval of resources used by the secondary system at a certain moment according to out of need. The retrieval time may be a short time and may be determined by a protocol, and after the resources are retrieved, the secondary system may use them opportunistically in consideration of the use of the resources by the primary system.

In the environment in which the primary system and the secondary system utilize the resources together according to the various methods as described above, the secondary system may borrow resources from one or more primary systems and use them. In addition, as described above, based on the relationship between U6 and SBe in FIG. 5, the secondary system may have its own specific resources.

Figure 6:
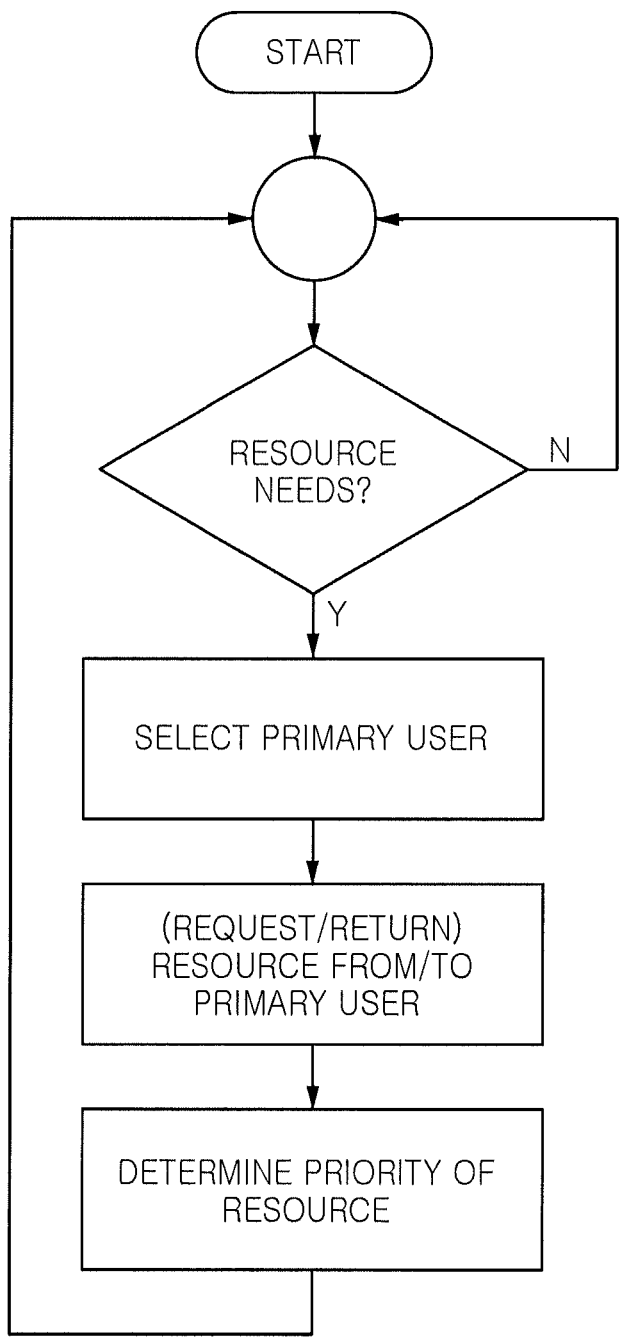
FIG. 6 illustrates the determining of priority of resources.

FIG. 6 illustrates the determining of priority of resources. With reference to FIG. 6, as users enter and exit, the secondary system checks its resource utilization situation, and when additional resources are required, the secondary system selects one of one or more primary systems around it. In this case, the secondary system selects resources of various primary systems with which it has entered into a contract to utilize resources of them or primary systems that do not raise objections although their resources are shared, according to priority.

The priority applied in this case must consider the cost (a frequency cost, a data rate that can be supported by frequency, a configuration of the system for supporting frequency, etc.) incurred in using the corresponding resources. Next, the secondary system requests resources from the primary system. The requesting behavior may be performed offline (i.e., through behavior such as the parties concerned with the two systems entering into direct discussion) or online (through a communication protocol on the system), or the requesting behavior may be opportunistically performed without informing the primary system.

Subsequently, the secondary system compares the borrowed resources with other resources and internally determines priority. In this case, priority reflects the characteristics of the corresponding resources. For example, priority includes the frequency (amount) with which the primary system uses the corresponding resources or the cost incurred to use the corresponding resources as mentioned above.

The frequency with which the primary system uses the corresponding resources is affected by the characteristics of the primary system and varies temporally, spatially, and on a case-by-case basis (occasionally or incidentally). For example, the primary system may use the resources at weekends, in the morning or evening, in a conference hall, in a playground, in an exhibition hall, in an emergency situation, and the like. Thus, priority levels of resources are determined in consideration of these various situations.

In addition, upon checking the operational situation of resources of the secondary system, if resources remain, the secondary system may return them according to priority. As discussed above, the primary user is selected so that the resources can be returned starting from the lowest priority level, and in this case, the resources may be returned online or offline, and when the resources have been used opportunistically, the use of the resources may be simply stopped. When the returning of resources is finished, the priority levels of the remaining resources are adjusted.

In this case, the requested amount of resources for allocation or the return amount of resources may be set in consideration of the past history such as the amount of resources already in use by the system or the density (a call arrival time, a traffic density, etc.) of a service that uses resources or the futuristic possibility when the corresponding system requests allocation or return.

As for determining priority, for example, the amount of resources used by the primary user is checked. In the case that the primary user uses many resources, this suggests that there is a high possibility that the primary user will request retrieval of the corresponding resources. When a retrieval request rate from the primary user with respect to resources borrowed from the lth primary user among various primary users is $$\rho_l \left( = \frac{\lambda_l}{\mu_l} \right),$$

the retrieval request rate may be a concept including the frequency of retrieval and the period of retrieval and may be characterized by a service arrival rate $\lambda_l$ and a service rate $\mu_l$ over the system of the lth primary user. In case of CDMA, it can appear as a noise power lever used by users together, in case of OFDM, it can appear as a spectrum bin, and in case of WLAN, it can appear as a time of a packet and the like.

Also, the cost of the corresponding frequency block (or spectrum block (SB)) may be called $C_l$, and the characteristics of the corresponding frequency may be called $H_l$. Here, as for the frequency characteristics, a low frequency can be stably transmitted farther, while a high frequency can obtain a higher transmission rate, and it can vary depending on the environment in which the corresponding frequency is in use.

Besides the three cases as described above, various parameters may be used to determine the priority of resources. With only the three cases considered, for example, a priority level of a spectrum block borrowed from an lth primary user may be determined as $Pr(SB_l) = W_\rho * \rho_l + W_C * C_l + W_H * H_l$ In this case $W_\rho$, $W_C$, $W_H$ are weight values with respect to $\rho, C, H$ The priority may be adjusted according to the purpose of the user by using weight values. When priority levels are determined and resources are used according to their priority levels, obviously, resources of higher priority levels can be used more.

Figure 7:
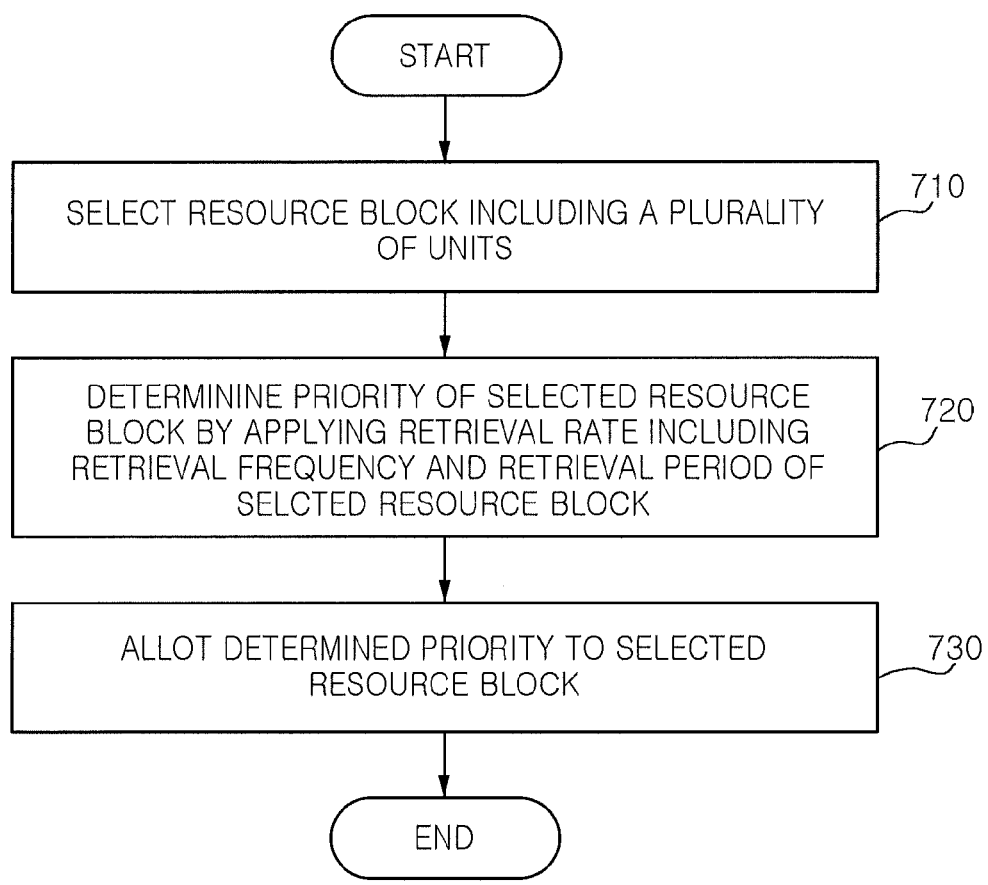
FIG. 7 is a flow chart illustrating the process of a method for allocating priority to resources according to an exemplary embodiment of the present invention.

FIG. 7 is a flow chart illustrating the process of a method for allocating priority to resources according to an exemplary embodiment of the present invention.

The method for allocating priority to resources according to an exemplary embodiment of the present invention may include: selecting a resource block including at least one unit (step 710); determining a priority level of the selected resource block by reflecting (or in consideration of or according to) a retrieval rate (or a recovery rate) including a retrieval frequency and a retrieval period of the selected resource block (step 720); and allotting the determined priority level to the selected resource block (step 730).

First, the resource block may be a spectrum block of radio communication, and the priority level may be dynamically changed.

Next, in determining the priority level of the selected resource block, the priority level of each unit constituting the selected resource block may be determined to be different, and the priority level to be determined for each unit may be determined by reflecting an expectation value of the retrieval rate of the selected resource block.

In addition, in determining the priority level of the selected resource block (step 720), the priority level may be determined by reflecting at least one of the expectation value of the retrieval rate of the selected resource block and the probability that retrieval of the selected resource block will be requested.

Figure 8:
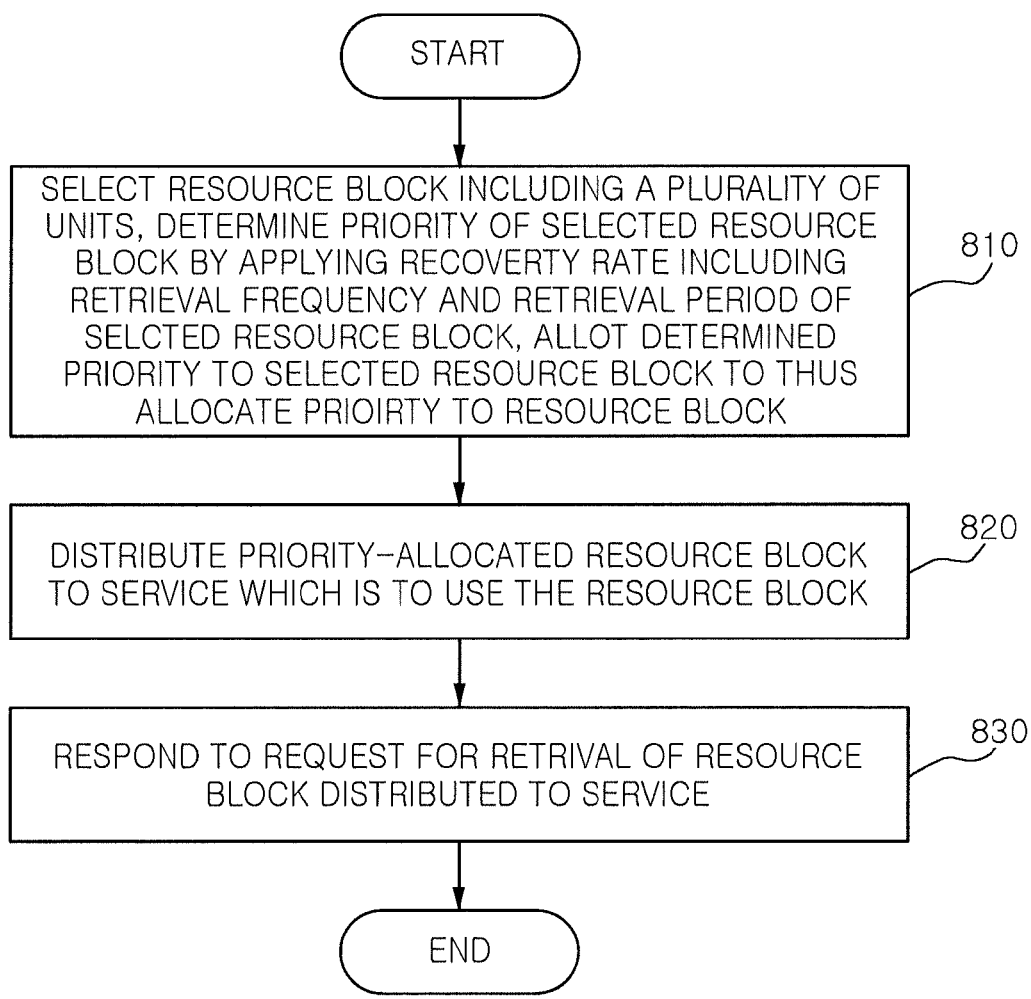
FIG. 8 is a flow chart illustrating the process of a method for operating resources using the resource priority allocation method according to an exemplary embodiment of the present invention.

FIG. 8 is a flow chart illustrating the process of a method for operating resource using the resource priority allocation method according to an exemplary embodiment of the present invention.

With reference to FIG. 8, the method for operating resources by using the resource priority allocation method according to an exemplary embodiment of the present invention includes: selecting a resource block including at least one unit, determining a priority level of the selected resource block by reflecting a retrieval rate including a retrieval frequency and a retrieval period of the selected resource block, and allotting the determined priority level to the selected resource block, thereby allocating the priority level to the resource block (step 810); distributing the priority level-allocated resource block to a service which is to use the resource block (step 820); and retrieving the resource block which has been distributed to the service (step 830).

In allocating the priority level of the selected resource block (step 810), each of a plurality of units constituting the selected resource block may have a different priority level, and the priority level determined for each unit may be determined by reflecting an expectation value of a retrieval rate of the selected resource block.

Also, in allocating the priority level to the resource block, the priority level may be allotted by reflecting at least one of an expectation value of a retrieval rate of the selected resource block, the probability that retrieval of the selected resource block will be requested, the amount of resource blocks remaining unused among the selected resource blocks which have been used, and the number of the selected resource blocks.

Next, in distributing the priority level-allocated resource blocks to a service which is to use the resource blocks (step 820), the resource blocks may be distributed according to the QoS (Quality of Service) of the service.

Next, in retrieving the resource blocks distributed to the service (step 830), when a requested retrieval amount of resource blocks is smaller than the amount of unused resources, the unused resources may be retrieved, and when the requested retrieval amount of resource blocks is greater than the amount of unused resources, the unused resources may be retrieved, resources corresponding to the difference between the requested retrieval amount of the resource blocks and the unused resources may be handed off, and the service of resources that cannot be handed off may be dropped.

In the following description, it is assumed that one service uses one resource unit, in order to develop a simple discussion with respect to resources. In an actual environment, the amount of resources used by each service may differ, but in the present exemplary embodiment, each service will be described based on only one resource unit for the sake of brevity, however, the present invention is not limited thereto. For example, in a situation in which a secondary user borrows five resources from a primary user and operates them, two resources are allocated to be used for two types of services, respectively, and one resource is idle. In this state, when the primary user requests retrieval of two resources, the secondary user must spectrum-hand off or cancel one of the two resources used for the service and return two among the three resources including one idle resource. However, in the following description, it is assumed that one service uses one resource.

In addition, in retrieving the resource blocks distributed to the service, resources used by the service may be handed off starting from a service of a low priority level to a service of a high priority level, and a service which is using resource that cannot be handed off may be dropped.

Figure 9:
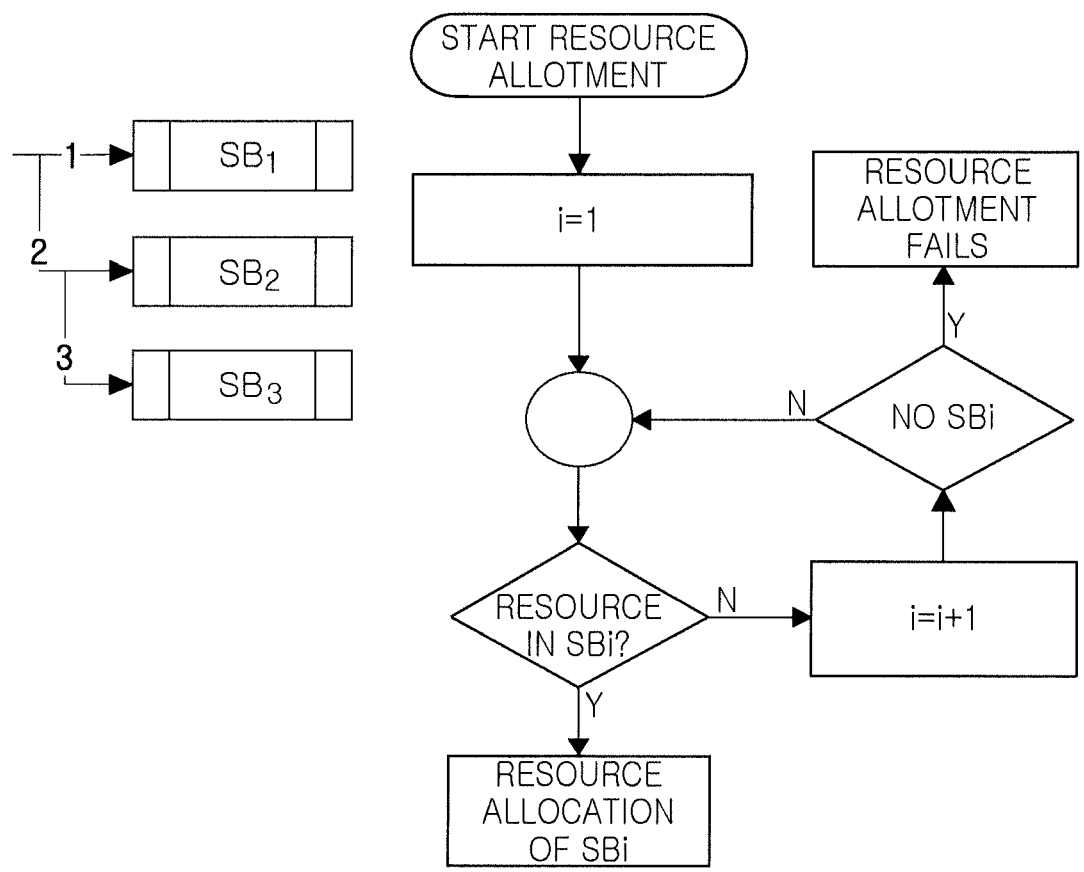
FIG. 9 illustrates resource distribution.

FIG. 9 illustrates resource distribution. First, resources are aligned starting from one of the highest priority, such as SB1, SB2, and SB3.

In this method, resources are allocated in the event of a new call; in the occurrence of a handoff according to a change in a channel state; in the occurrence of a handoff between different radio access technologies (RATs) according to a user preference; and in the event of calls in various cases including general spectrum handoff. When a call is received, it is checked as to whether a resource of the highest priority level can be allocated. When the resource of the highest priority level can be allocated, it is allocated, or otherwise, the resource of the next high priority level is checked. That is, the resources of the lower priority levels are checked sequentially. Namely, allocation is attempted in the order starting from SB1, SB2, and SB3.

In this case, in a state in which the resources are allocated in the foregoing manner and operated, when the primary user requests retrieval of the resource, the existing call must be moved to a different resource. In this case, assuming that the PU requesting retrieval of the resource is $U_I$ and $U_I$ requests retrieval of the resource by the amount of $\gamma$ from the SDI, if the amount of the resource requested to be retrieved is smaller than or equal to the amount of resource not in use currently among those borrowed from $U_I$ (namely, $\gamma \le S_I^r$, wherein $S_I^r$ is the amount of resource remaining unused among the $SB_I$ resource), the $SB_I$ by the amount of $\gamma$ among the remaining resource can be returned to $U_I$, without having to perform spectrum-hand off on the existing call.

Figure 10:
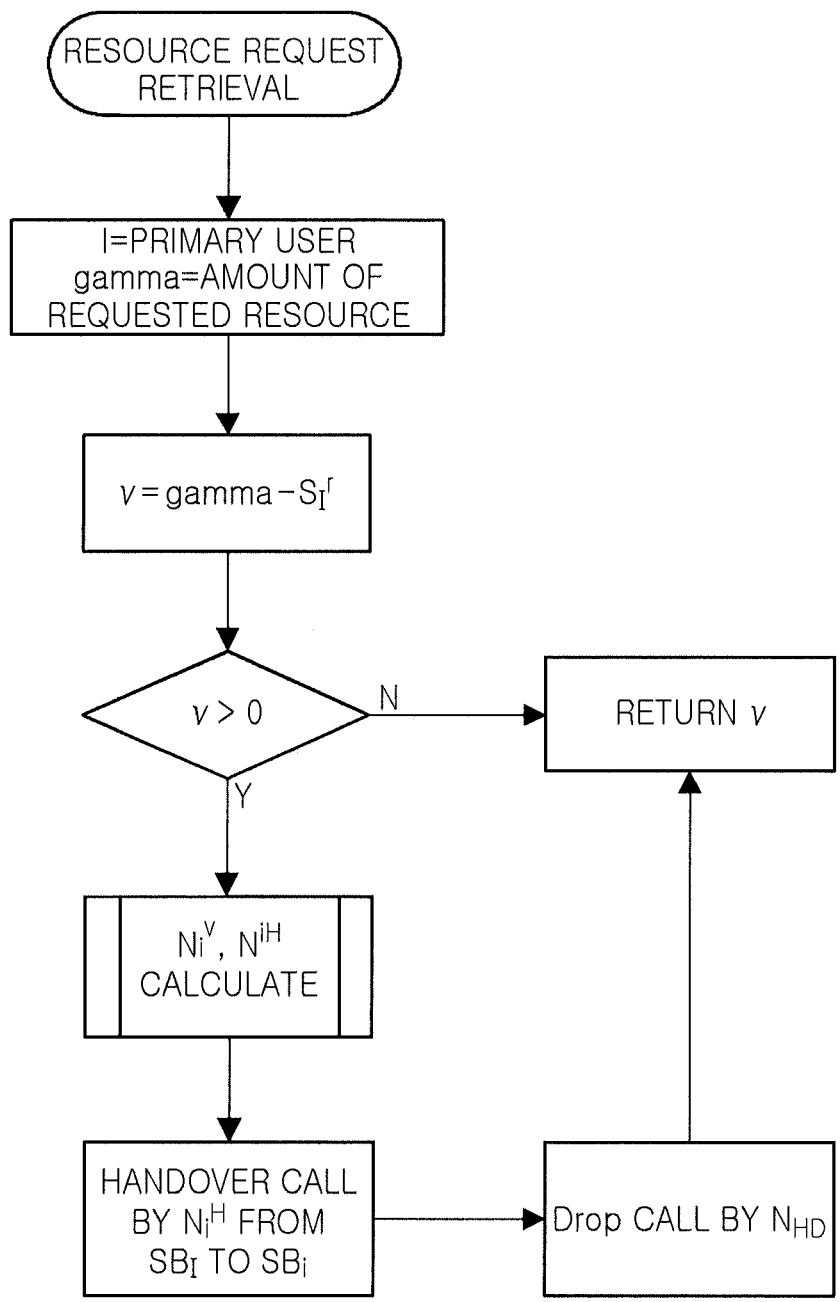
FIG. 10 illustrates resource retrieval.

FIG. 10 illustrates resource retrieval. If the amount of $\gamma$ requested to be retrieved by $U_I$ is larger than the amount of resource which has been borrowed from $U_I$ and is not in use ($\gamma > S_I^r$), spectrum handoff is performed according to the priority levels of the SBs as shown in FIG. 10. First, it is assumed that the primary user $U_I$ is identified as I and the amount of $\gamma$ of the resource requested to be retrieved by $U_I$ is gamma in FIG. 10.

In this case, the amount of $v(=\gamma-S_I^r)$ exceeding the resource $S_I^r$, the amount which is not in use so it can be immediately returned, among the resource of $SB_I$, must be spectrum-handed off to other SBs according to their priority levels. Here, first, if $v$ is smaller than or equal to 0, a portion of the entirety of the resource of $S_I^r$ can be returned as it is. Otherwise, $N_i^v$ and $N_i^H$ can be calculated as represented by Equation 1, Equation 2, and Equation 3 shown below.

Here, $N_i^v$ is the amount of resources of a call to be processed by $SB_i$ or SB of a lower priority level, and $N_i^H$ is the number of calls that can be directly processed by $SB_i$ through spectrum handoff. Namely, $SB_i$ must receive (or process) the call as much as $N_i^v$ through spectrum handoff, but in this case, actually, $N_i^H$ is handoff that can be actually received by $SB_i$ and $N_{i+1}^v$ is let to be processed by $SB_{i+1}$ of the next priority level.

$$N_1^v = \begin{cases} 0 & \text{if } I = 1 \\ \max(0, \gamma - S_I^r) & \text{if } I \ne 1 \end{cases} \quad \text{[Equation 1]}$$

$$N_2^v = \max(0, \gamma - S_I^r) \text{ if } I = 1$$

$$N_{i+1}^v = \begin{cases} N_i^v - N_i^H \cdot W_A & \text{if } i \ne I \\ N_{i-1}^v - N_{i-1}^H \cdot W_A & \text{if } i = I \end{cases} \quad \text{[Equation 2]}$$

$$N_i^H = \begin{cases} \min\left(\frac{N_i^v}{W_A}, \left\lfloor \frac{S_I^r}{W_A} \right\rfloor\right) & \text{if } i \ne I \\ 0 & \text{if } i = I \end{cases} \quad \text{[Equation 3]}$$

Here, $\lfloor X \rfloor$ is a maximum integer smaller than or equal to X. Among the above Equations, Equation 1 obtains $N_1^v$ and $N_2^v$ when $v$ is 0 or greater. Namely, Equation 1 obtains the amount to be received through spectrum handoff by $SB_1$ or $SB_2$ of the highest priority levels when the amount of $\gamma$ requested by $U_I$ cannot be returned even by returning the currently remaining resource $S_I^r$.

When I of $U_I$ has the highest priority level, if $SB_2$ has the highest priority level among those remains, $N_2^v$ is the amount of resource to be emptied by $SB_2$ and $SB_{is}$ s of the lower priority levels. When the initial value $N_i^v$ of $SB_i$ of the highest priority level is obtained as represented by Equation 1, $N_{i+1}^v$ and $N_i^H$ can be obtained accordingly.

Here, the overall number of spectrum handoffs to secure the resource by the amount γ requested by $U_I$ is $N_H(γ) = \Sigma_{i=1}^M N_i^H$. Thus, in order to return the resource by the amount of γ requested by $U_I$, over the users (calls) of the resources that cannot emptied even through spectrum handoff by the amount of $N_H(γ)$ including $S_I^r$, the calls by the number of $N_{HD}(γ)$ as represented by Equation 4 shown below are dropped or interrupted.

Here, $W_A$ is an average bandwidth of the resources used for the respective calls, and in the actual case, the bandwidth of individual calls can be known and directly used individually, but, here, the concept of a simple average is used as it is for the sake of convenience of expression.

$$N_{HD}(γ) = \begin{cases} N_{M-1}^v / W_A - N_{M-1}^H & \text{if } I = M \\ N_M^v / W_A - N_M^H & \text{if } I < M \end{cases}$$ [Equation 4]

Figure 11:
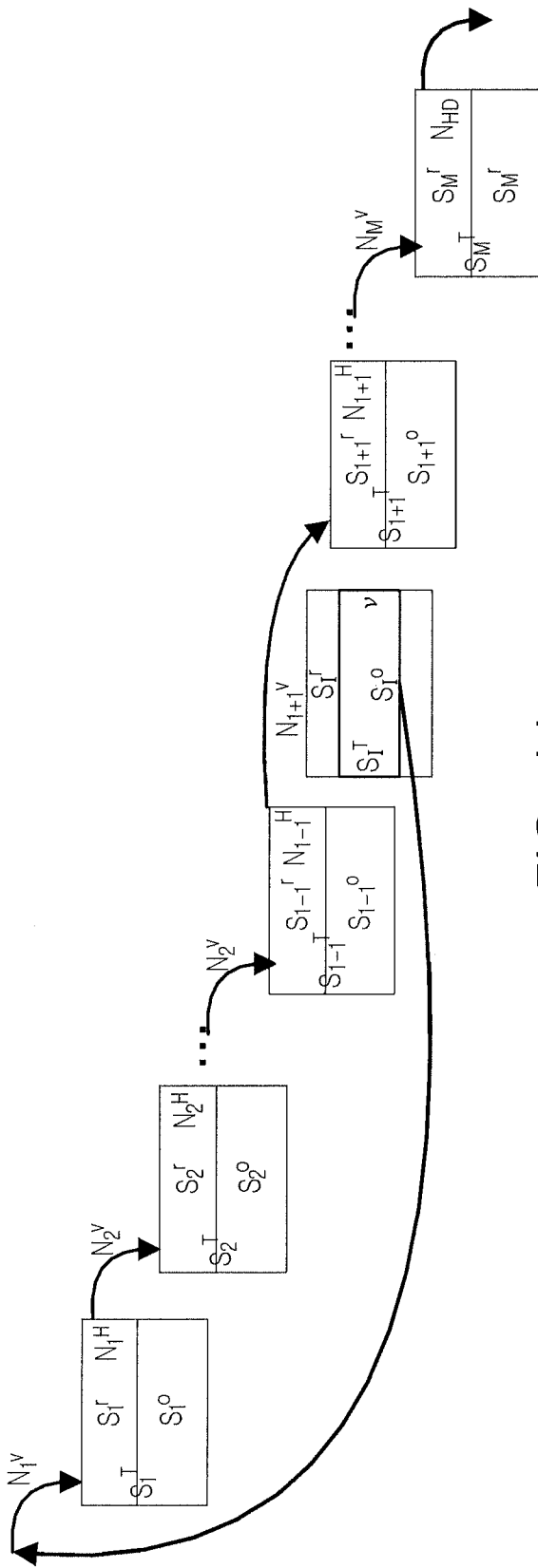
FIG. 11 illustrates the procedure for retrieving resources.

FIG. 11 illustrates the procedure for retrieving resources. The above description so far can be conceptually noted in a diagram form of FIG. 11. In the expression $S_i^r(=S_i^T-S_i^o)$ in FIG. 11, resources which are not in use currently are obtained by subtracting the resources ($S_i^o$) which are in use from the entire resources ($S_i^T$) which are borrowed from $U_I$.

First, in order to return γ requested by $U_I$, $v(=γ-S_I^r)$ exceeding $S_I^r$ in the identified spectrum of I is obtained, and it is then checked whether or not the corresponding users (calls) can be processed by $SB_I$ of the highest priority level.

Each $SB_i$ can process the users corresponding to the amount of $S_i^r$ emptied in each $SB_i$ through spectrum handoff ($N_i^H$), and hand over the amount of $N_{i+1}^v$, which cannot be processed, to $SB_{i+1}$ of the next priority level. Then, the service is dropped for the portion ($N_{HD}(γ)$) which cannot be processed by $SB_M$ of the last priority level. Here, it is assumed that there are M number of resources blocks.

In this case, the amount which cannot be processed by $SB_{I-1}$ is transferred to $SB_{I+1}$, rather than to $SB_I$. The reason is because $SB_I$ is an SB which has first raised $v=N_1^v$ or $v=N_2^v$ upon receiving a request for retrieving the resource $SB_I$ as much as γ from $U_I$.

Priority of resource selection has been described so far, and hereinafter, the application of user priority thereto will now be described. Performing spectrum handoff intrinsically causes degradation of QoS. For example, a portion or the entirety of data being transmitted may be lost or missing during handoff or a data transmission may be delayed.

Thus, in selecting calls corresponding to v among $S_i^o$, calls which are less affected by spectrum handoff may be preferentially selected in order to reduce degradation of QoS to be experienced by the user. For example, in case in which delay within a certain level, like a voice service or a streaming service, must be guaranteed, spectrum handoff is performed preferentially on a data service which is not sensitive to delay and can be retransmitted, in order to minimize a call negatively affected by degraded QoS due to spectrum handoff.

In addition, when resources equal to γ to be returned are not secured even by performing spectrum handoff on the calls of data services, spectrum handoff may be performed on the voice service or streaming service according to user classes.

As for user classes, when users who request high QoS or a lower cost are classified into gold, silver, and bronze users, spectrum handoff may be preferentially performed on the user of a lower class, to thereby minimize quality degradation that may be experienced by the user of a higher class.

In addition, when a user has agreed a contract that the bandwidth of a call may be adjusted, among the users, the resource equal to γ to be returned can be secured by simply adjusting the bandwidth before performing handoff, or the number of calls to be spectrum handed off can be reduced.

Here, the adjustment of the bandwidth of calls refers to adjusting the bandwidth provided to a service. When a streaming service is received, the bandwidth may be changed depending on the size or resolution of the screen, and in the case of a data service, a transfer rate may be changed. The adjusted bandwidth can be extended when there is leeway in the resources of $SB_s$ later. Also, when the user is on the move, a method of allocating a resource which is highly likely to be continuously used in an area to which the user is to move may be employed.

The application of resource priority and application of user priority have been described. Hereinafter, the application of resource priority will be described in more detail.

In the embodiment described above, the basic method of using the retrieval request rate $ρ_l$ when the primary user requests resource retrieval in order to minimize it is employed. In the following embodiment, the application of priority more elaborately by using an expectation value $E_l^γ$ with respect to the γ number of resources to be retrieved by the primary use will be described.

First, it is assumed that primary systems which lend resources is $\{U_l: 1 \leq l \leq M\}$ and a current secondary system is $U_S$, according to types of resources in use.

Here, it is also assumed that the original amount of resources before the system $U_l$ lends resources is $\{S_l^A: 1 \leq l \leq M\}$, and spectrum blocks borrowed by the system $U_S$ from each $U_l$, is $\{X_l: 1 \leq l \leq M\}$.

Then, the amount of resources borrowed by the system $U_S$ from each $U_l$ can be represented by $\{S_l^L: S_l^L = |X_l|, S_l^L \leq S_l^A\}$. Here, |X| is the size of a spectrum block X.

When an average load ($λ_l/μ_l$) of the system $U_l$ during a period in which the system $U_l$ which has lent resources is $ρ_l$, $\{P_{j,l}: 0 \leq P_{j,l} < 1, 0 \leq j \leq S_l^A, 1 \leq l \leq M\}$ can be obtained by using the resource $S_l^A$ of $U_l$, the size $S_l^L$ of the spectrum blocks $X_l$ borrowed by $U_S$ from each $U_l$, and $ρ_l$ (through an analysis of M/M/C/C queuing system). Here, $P_{j,l}$ is the probability that the system $U_l$, which has lent resources, will use j number of resources, and the sum of $P_{j,l}$ with respect to each primary user 1 is 1 ($\Sigma_{j=0}^{S_l^A} P_{j,l} = 1$). The probability that $U_l$, which has lent resources, will request retrieval of one or more of the lent resources $S_l^L$ from $U_S$ can be defined as $\{Q_l^γ: \Sigma_{j=S_l^A-S_l^L+1}^{S_l^A} P_j, l, 1 \leq l \leq M\}$, and when the system $U_l$, which has lent resources, requests retrieval of resources among the lent resources $S_l^L$, the average amount of requested resources may be represented as $\{E_l^γ: \Sigma_{j=S_l^A-S_l^L+1, k=1}^{S_l^A, S_l^L} k \cdot P_{j,l}, 1 \leq l \leq M\}$. Thus, $X_l$ can be divided into $D_l$, $E_l$, and $F_l$ by using it, and in this case, each size can be divided as represented by Equation 5 according to $E_l^γ$.

$|D_l|=S_l^d, |E_l|=S_l^e, |F_l|=S_l^f$ $\{S_l^d:[E_l^γ], 1 \leq l \leq M\}$ $\{S_l^e:[E_l^γ-S_l^d], 1 \leq l \leq M\}$ $\{S_l^f:S_l^L-(S_l^d+S_l^e), 1 \leq l \leq M\}$ [Equation 5]

Here, $D_l$ is the amount of resources having the highest retrieval probability, which is smaller than or equal to $E_l^γ$ among the borrowed resources. $E_l$ is the amount of resources having a relatively high retrieval probability among the borrowed resources. When $E_l^γ$ includes a value under a decimal point, if the decimal portion is greater than 0, $E_l^γ$ is expressed as 1, and if the decimal portion is 0, $E_l^\gamma$ is expressed as 0. Here, each spectrum resource does not have a decimal portion, so the decimal portion of $E_l^\gamma$ is additionally indicated. $F_l$ is the amount of resources having a relatively low retrieval probability among the borrowed resources, which exceeds $E_l^\gamma$.

FIG. 11 illustrates these as a diagram. Specifically, FIG. 11 shows the procedure of retrieving resources. In FIG. 11, $D_{l_s}$, $E_{l_s}$, $F_{l_s}$ are illustrated to have the same size for the sake of convenience, but, $D_{l_s}$, $E_{l_s}$, $F_{l_s}$ are differently configured according to the foregoing formula.

Figure 12:
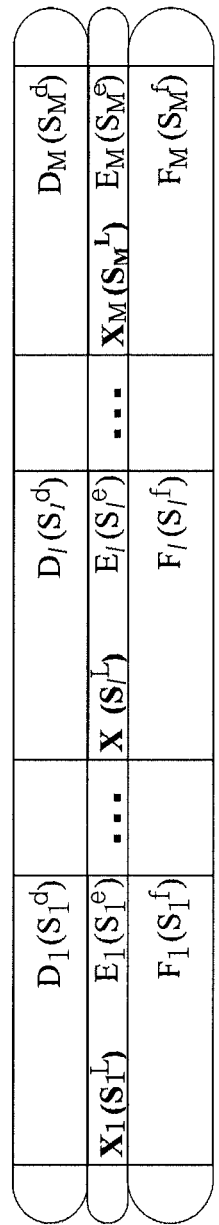
FIG. 12 illustrates determining of priority of resource units constituting a resource block.

FIG. 12 illustrates the determining of priority of resource units constituting resource blocks. As shown in FIG. 12, each $X_l$ is divided into $D_l$, $E_l$, $F_l$. Here, priority is given to $D_l$, $E_l$, $F_l$ as follows. Here, every $Pr(D_l)$ may have the same value 0, because every $D_l$ is smaller than or equal to $E_l^\gamma$.

$$Pr(D_l)=1-Q_l^\gamma$$

$$Pr(E_l)=2-Q_l^\gamma$$

$$Pr(F_l)=3-Q_l^\gamma \qquad \text{[Equation 6]}$$

Namely, $F_l$ has the highest priority level, $E_l$ has the next highest level, and $D^l$ has the last priority level. Then, the respective resources of the above diagram are aligned as expressed in the following diagram according to their priority level.

Figure 13:
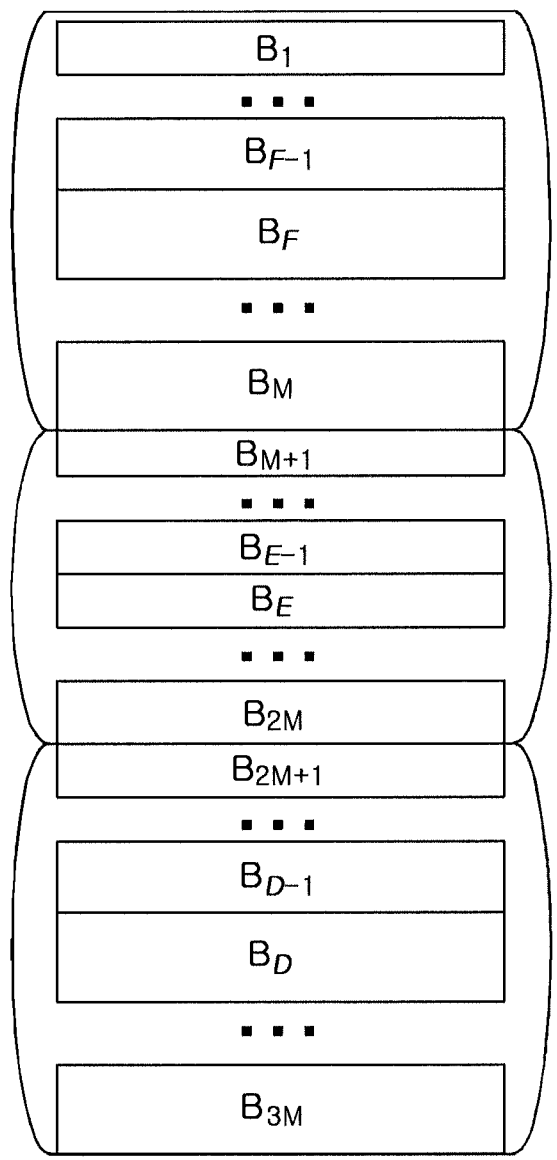
FIG. 13 illustrates the distributing of priority of a plurality of resource units constituting resource blocks.

FIG. 13 illustrates the distributing of priority of a plurality of resource units constituting resource blocks. Here, $B_1$ to $B_{3M}$ can be aligned according to their priority level as represented by Equation 7 shown below, in which as $X_l$ is divided into the three $D_l$, $E_l$, and $F_l$, M is increased to the number 3M.

$$\Psi\{B_i:B_i=D_l,E_l, \text{ or } F_l, 1<i<3M, 1<l<M\}$$

$$\text{where } [\Psi:B_i] \leq [\Psi:B_{i+1}] \text{ if } Pr(B_i) \geq Pr(B_{i+1}) \qquad \text{[Equation 7]}$$

Here, $D_l$, $E_l$, and $F_l$ are expressed as $B_i$, and $B_{i_s}$ are aligned according to the size of $Pr(B_i)$. Here, [S:F] indicates the order of F in a set S, and $\Psi$ is a set of resource blocks aligned such that they have a higher priority level as $Pr(B_i)$ is larger.

When a currently used portion in the spectrum block of each $B_i$ is classified as $B_i^o$ and a portion not in use is classified as $B_i^r$, $B_i=B_i^o \cup B_i^r$. Here, the sizes of the spectrum blocks $B_i$, $B_i^o$, and $B_i^r$ are determined to be $S_i^T$, $S_i^o$, $S_i^r$, respectively, as represented by Equation 8 shown below:

$$S_i^T=|B_i|, S_i^o=|B_i^o|, S_i^r=|B_i^r|$$

$$S_i^T=S_i^o+S_i^r \qquad \text{[Equation 8]}$$

At this time, when the primary user $U_I$ requests retrieval of resources by the amount of $\gamma(\leq S_I^L)$, resources are to be returned from $D_I$, $E_I$, and $F_I$, and these correspond to $B_D$, $B_E$, and $B_F$, as in Equation 8 shown below. Namely, $X_I=B_D \cup B_E \cup B_F$. Here, $B_D=D_I, B_E=E_I, B_F=F_I$.

The size of each of the resources $B_D$, $B_E$, $B_F$, the size of resources in use, and the size of empty resource are defined as represented by Equation 9 shown below:

$$S_D^T=|B_D|, S_D^o=|B_D^o|, S_D^r=|B_D^r|$$

$$S_E^T=|B_E|, S_E^o=|B_E^o|, S_E^r=|B_E^r|$$

$$S_F^T=|B_F|, S_F^o=|B_F^o|, S_F^r=|B_F^r| \qquad \text{[Equation 9]}$$

The method of returning $\gamma$ requested by $U_I$ by using the priority levels and the sizes of resources blocks as described above is as follows.

Figure 14:
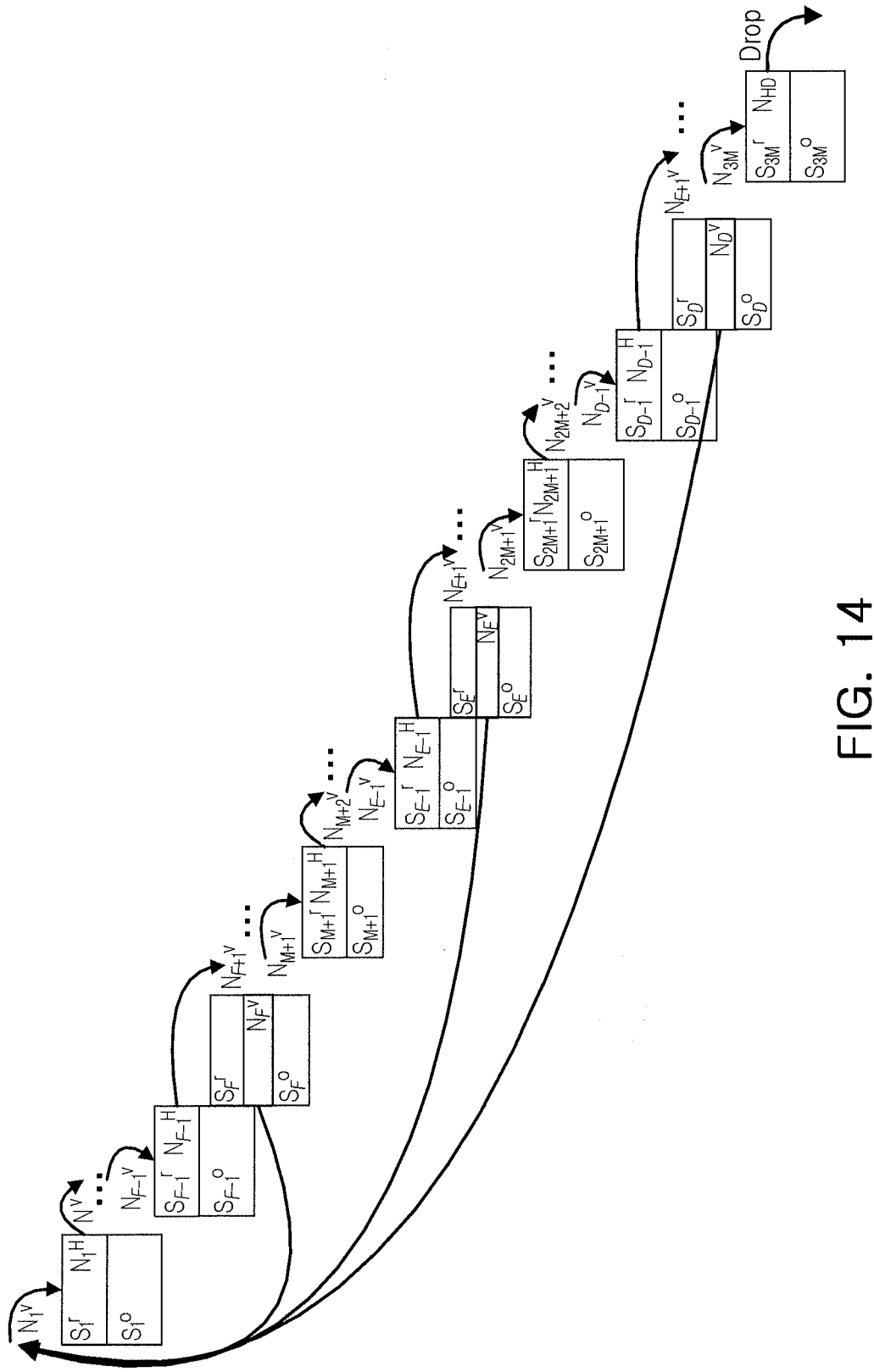
FIG. 14 illustrates the procedure of retrieving resources by resource units constituting resource blocks.

FIG. 14 illustrates the procedure of retrieving resources by resource units constituting a resource block.

First, in case of $\gamma \leq S_D^r$, a portion or the entirety of the resources of $B_D^r$ may be returned, and $S_E^r=\max(0,S_D^r+S_E^r-\gamma)$.

In case of $\gamma \leq S_D^r+S_E^r$, the entirety of the resources of $B_D^r$ and a portion or the entirety of the resources of $B_E^r$ may be returned, and $S_D^r=0$, $S_E^r=\max(0,S_D^r+S_E^r-\gamma)$.

In case of $\gamma \leq S_D^r+S_E^r+S_F^r$, the entirety of resources of $B_D^r$ and $B_E^r$ and a portion of the resources of $B_F^r$ or the entire resources $\gamma$ may be returned to $U_I$, and $S_D^r=S_E^r=0$, $S_F^r=\max(0,S_D^r+S_E^r+S_F^r-\gamma)$.

In case of $\gamma > S_D^r+S_E^r+S_F^r$, the resources ($B_D^r$, $B_E^r$, and $B_F^r$) remaining unused may be all returned as they are, and the amount of the resources in use which are to be returned may be determined as $v$. In this case, $v=\max(0, \gamma-(S_D^r+S_E^r+S_F^r))$, and $S_D^r=S_E^r=S_F^r=0$. At this time, a spectrum unit to be additionally emptied through spectrum handoff from $B_D^r$, $B_E^r$, and $B_F^r$ is $v$.

$$N_D^v=\max(0,\min(v,S_D^o))$$

$$N_E^v=\max(0,\min(v-N_D^v,S_E^o))$$

$$N_F^v=\max(0,\min(v-(N_D^v+N_E^v),S_F^o)) \qquad \text{[Equation 10]}$$

Here, calls selected over $v$ may be selected as represented by Equation 10 according to their priority level, or arbitrarily selected as the number of calls satisfying $v=N_D^v+N_E^v+N_F^v$, $0 \leq N_D^v \leq S_D^o$, $0 \leq N_E^v \leq S_E^o$, and $0 \leq N_F^v \leq S_F^o$. Also, the calls selected over $v$ may be selected according to the service used by the calls, the class of the calls, and the like, in consideration of the degradation of QoS due to spectrum handoff.

When $v$ is determined, the spectrum unit $N_i^v$ to be emptied by $B_i$ to $B_{3M}$ can be obtained as represented by Equation 11 shown below.

Equation 11 below represents the amount of resources to be emptied by the resource block of the highest priority level from $v$. When the priority level of $B_F$ is the highest because $Q_I^\gamma$ of $U_I$ is the lowest, $B_2$ would have the highest priority level in order to meet the request of return of $\gamma$ from $U_I$.

Equation 12 represents the amount of resources to be emptied from the resource blocks of the next priority level. $N_i^v$ is the amount of resources to be processed through spectrum handoff at $B_i$ and resource blocks of the lower priority level, and $N_i^H$ is the number of calls that can be emptied through spectrum handoff by $B_i$. Thus, $B_i$ receives the call of $N_i^H$ among $N_i^v$ by handoff, and requests $N_{i+1}^v$ again from $B_{i+1}$.

$$N_1^v = \begin{cases} 0 & \text{if } [\Psi:B_F]=1 \\ \max(0,v) & \text{if } [\Psi:B_F] \neq 1 \end{cases} \qquad \text{[Equation 11]}$$

$$N_2^v = \max(0,v) \text{ if } [\Psi:B_F]=1$$

$$N_{i+1}^v = \begin{cases} N_i^v - N_i^H \cdot W_A & \text{if } i \notin \{D,E,F\} \\ N_{i-1}^v - N_{i-1}^H \cdot W_A & \text{if } i \in \{D,E,F\} \end{cases} \qquad \text{[Equation 12]}$$

$$N_i^H = \begin{cases} \min\left(\frac{N_i^v}{W_A}, \left\lfloor \frac{S_i^r}{W_A} \right\rfloor \right) & \text{if } i \notin \{D,E,F\} \\ 0 & \text{if } i \in \{D,E,F\} \end{cases} \qquad \text{[Equation 13]}$$

Finally, even in the resource block of the lowest priority level, the service is interrupted for the number of calls that cannot be received through spectrum handoff. If the priority level of $B_D$ is the lowest because $Q_I^\gamma$ of $U_I$ has the highest priority level, the inability of processing by $B_{3M-1}$ having the immediately higher priority level is interrupted $$N_{HD}(\gamma) = \begin{cases} N^v_{3M-1}/W_A - N^H_{3M-1} & \text{if } [\Psi:B_D] = 3M \\ N^v_{3M}/W_A - N^H_{3M} & \text{if } [\Psi:B_D] < 3M \end{cases} \quad \text{[Equation 14]}$$

Figure 15:
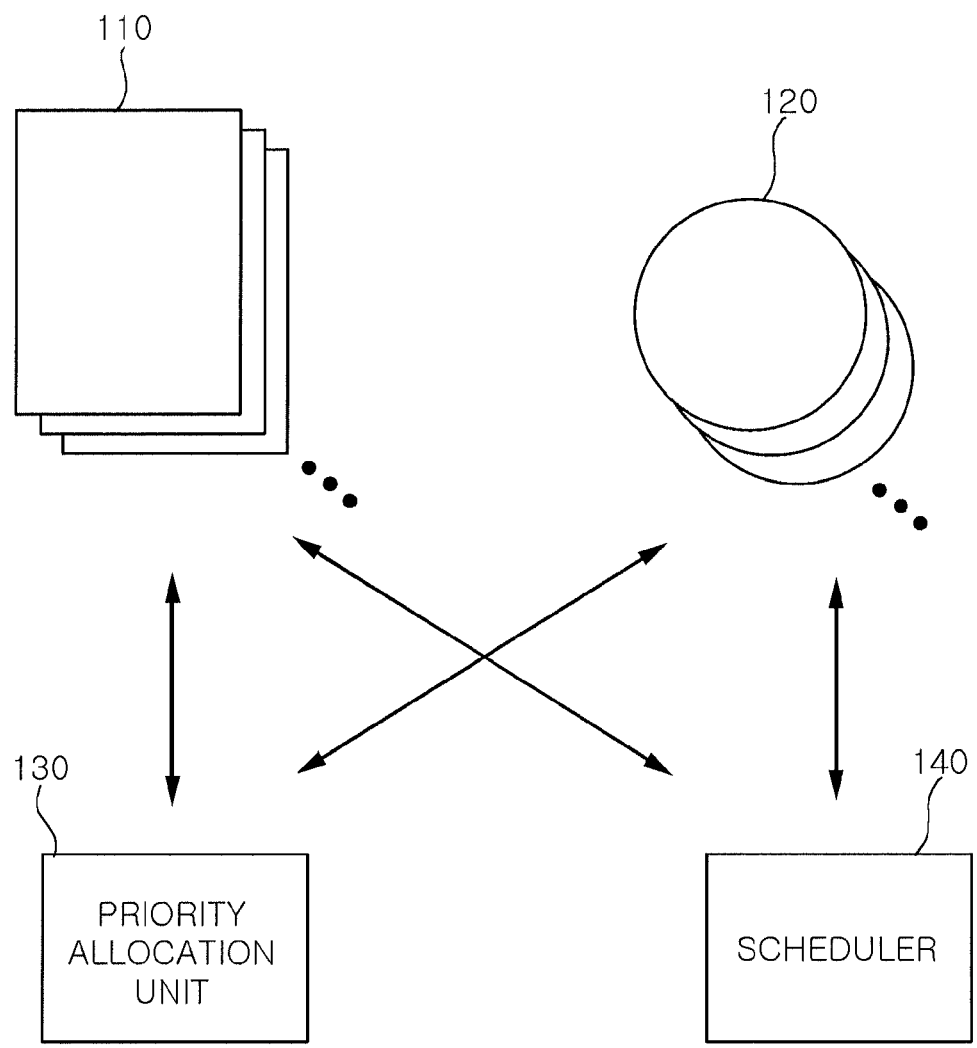
FIG. 15 is a schematic block diagram for explaining a resource operating apparatus using the resource priority allocation method according to an exemplary embodiment of the present invention.

FIG. 15 is a schematic block diagram for explaining a resource operating apparatus using the resource priority allocation method according to an exemplary embodiment of the present invention.

With reference to FIG. 15, an apparatus 100 for operating resources using a resource priority allocation method includes a plurality of resource blocks 110 including at least one unit, a plurality of services 120 to use the plurality of resource blocks, a priority allocation unit 130 determining a priority level of each of the resource blocks by reflecting a retrieval frequency and a retrieval period of each of the resource blocks and allotting the determined priority level to selected resource blocks, to thus allocate the priority level to the resource blocks, and a scheduler 140 distributing the priority level-allocated resource blocks to the services and retrieving the priority level-allocated resource blocks from the services.

First, the priority allocation unit 130 may determine a different priority level for each of the units, and the priority level determined for each of the units may be determined by reflecting an expectation value of a retrieval rate of the resource blocks.

Also, the priority allocation unit 130 may allocate the priority or determine resource use probability by reflecting at least one of an expectation value of a retrieval rate of the selected resource block, the probability that retrieval of the selected resource block will be requested, the amount of resource blocks remaining unused among the selected resource blocks which have been used, and the number of the selected resource blocks.

The scheduler 140 may distribute resources agreed upon with the primary user to various services of secondary user or retrieve them. The secondary user may have such a form as today's base station or may have a form of an individual user. One scheduler 140 may exist for each secondary user to distribute resources to various services of the secondary user or retrieve them. Moreover, schedulers may exist separately for the various services of the secondary user and distribute or retrieve resources cooperatively or opportunistically.

The scheduler 140 may distribute the priority level-allocated resource blocks to the services and retrieve the priority level-allocated resource blocks from the services, according to the priority levels of the resource blocks. The scheduler 140 may distribute the priority level-allocated resource blocks to the services and retrieve the priority level-allocated resource blocks from the services, according to the QoS of the services. The scheduler 140 may distribute the use of resource blocks randomly according to the use probability of the respective resource blocks determined by the priority allocation unit 130.

In retrieving the resource blocks distributed to the services, when a requested retrieval amount of resource blocks is smaller than the amount of unused resources, the scheduler may retrieve the unused resources, and when the requested retrieval amount of resource blocks is greater than the amount of unused resources, the scheduler may retrieve the unused resources, and the scheduler may hand off resource corresponding to the difference between the requested retrieval amount of the resource blocks and the unused resources and drop a service of resource that cannot be handed off.

In the above description, spectrum handoff is performed gradually toward the resource blocks having a lower priority level according to the priority levels of the resource blocks. A method for further dividing priority will now be described.

In a first case, the radio access technology that lends resources gives a priority level to one resource block to be lent. In a second case, the RAT that lends resources, divides a resource block into three resource blocks and gives priority levels to each of the three resource blocks. At this time, the RATs that lend resource blocks subdivide resource blocks with reference to the patterns used by the RATs.

For example, two RATs, i.e., RAT1 and RAT2, have five resources, respectively. In this state, when RAT 3 borrows 3BU (Bandwidth Unit) from RAT1 and four resources from RAT2, if $\rho_1$ and $\rho_2$ of RAT1 and RAT2 are known, the probability that RAT1 and RAT2 will use 0 resource, one resource, two resources, three resources, four resources, and five resources can be known. This can be represented by P10, P11, P12, P13, P14, and P15 in case of RAT1 and can be represented by P20, P21, P22, P23, P24, and P25 in case of RAT2.

Here, because RAT3 has borrowed three resources, when RAT1 is P13, RAT3 must return one resource, when RAT1 is P14, RAT3 must return two resources, and when RAT1 is P15, RAT3 must return three resources.

If RAT3 is not using the resources to be returned, RAT3 can return them as it is, but when RAT3 is using the resources to be returned, it must perform spectrum handoff to return the corresponding resources in order to prevent a call interruption.

Here, as for P10, P11, P12, P13, P14, and P15, the probability of requesting a return of three resources would be P15, the probability of requesting a return of two resources would be P14, and the probability of requesting a return of one resource would be P13. In this case, the probability of requesting a return of three resources would be lower than the probability of requesting a return of two resources, and the probability of requesting a return of two resources would be lower than the probability of requesting a return of one resource.

Thus, rather than employing P10, P11, P12, P13, P14, and P15, P'10, P'11, P'12, P'13, P'14, P'15 are used, and in this case, P'15=P15, P'14=P14+P'15, P'13=P13+P'14 are used. Then, P'15 is applied as the probability that RAT1 will request a return of three resources from RAT3, P'14 is applied as the probability that RAT1 will request a return of two or more resources from RAT3, and P'13 is applied as the probability that RAT1 will request a return of one or more resources from RAT3.

Similarly, when the same rule is applied to RAT2, P'25 is applied as the probability that RAT2 will request a return of four resources from RAT3, P'24 is applied as the probability that RAT2 will request a return of three or more resources from RAT3, P'23 is applied as the probability that RAT2 will request a return of two or more resources from RAT3, and P'12 is applied as the probability that RAT2 will request a return of one or more resources from RAT3, The resources are given the priority levels according to the probability P' corrected thusly. Namely, when resources corresponding to P' having a low probability are preferentially disposed at the front, the resources are arranged to be similar to the disposition that the resources of RAT1 and RAT2 are disposed in a cross manner.

Here, the aligned resources can be regarded as resource blocks, and when RAT1 or RAT2 request the retrieval of the resources as in the above-described two methods, the resources may be allocated stepwise according to their priority levels or spectrum handoff is applied.

In the foregoing three methods, resources are allocated in turn according to their priority level and spectrum handoff is performed. However, a plurality of secondary users may use resources according to circumstances, so additional controlling may be necessarily performed over the method of controlling priority, causing complexity. Thus, a method for applying the probability as described above will now be described. The three methods as described above are directed to the use of resources sequentially according to their priority level, while the following method is a resource operating method employing probability.

Figure 16:
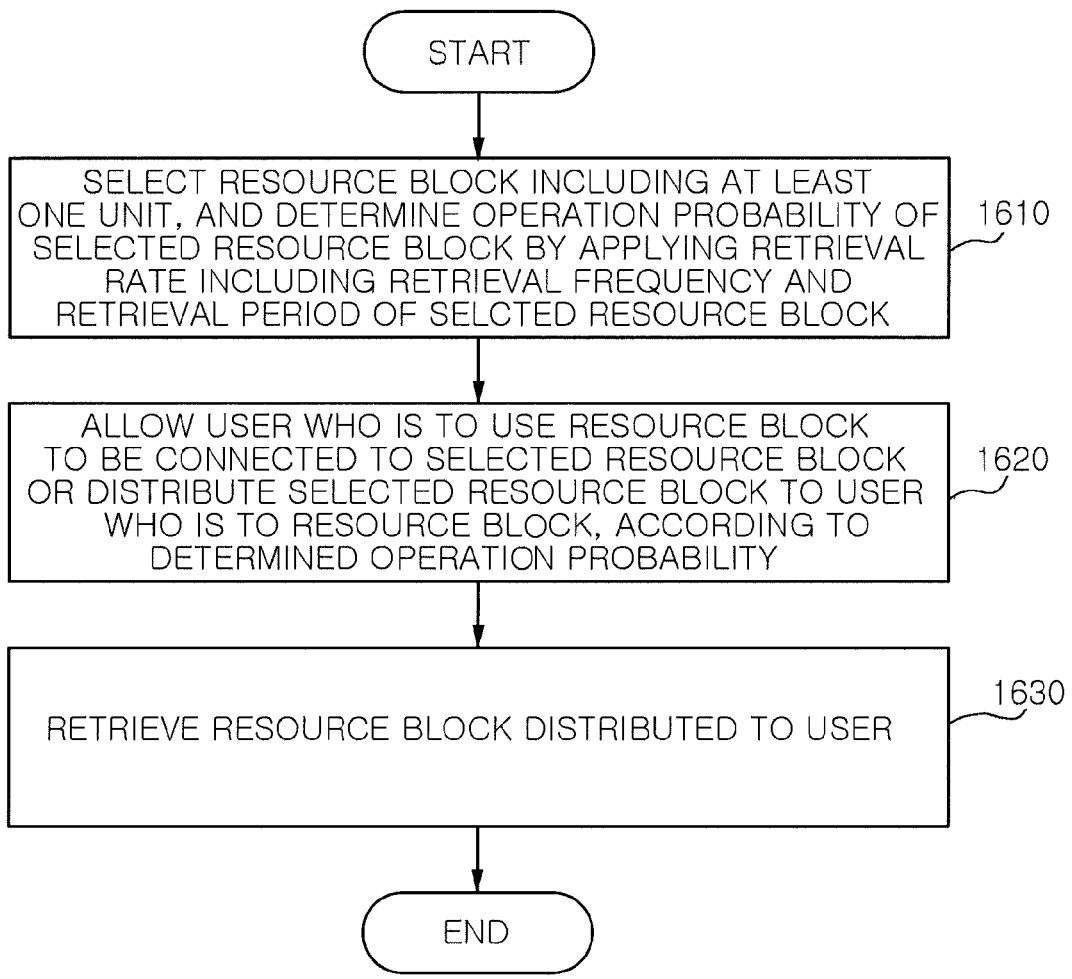
FIG. 16 is a flow chart illustrating the process of a method for operating resources using an operation probability according to an exemplary embodiment of the present invention.

FIG. 16 is a flow chart illustrating the process of a method for operating resources using an operation probability according to an exemplary embodiment of the present invention.

With reference to FIG. 16, the method for operating resources by using operation probability according to an exemplary embodiment of the present invention includes: selecting resource blocks each including at least one unit and determining an operation probability of the selected blocks by reflecting a retrieval rate (or recovery rate) including a retrieval frequency and a retrieval period of the selected resource blocks (step 1610); distributing the selected resource blocks to a user who is connected to the selected resource blocks to use the resource blocks or to a user who is to use the resource blocks, according to the determined operation probability (step 1620); and retrieving the resource blocks distributed to the user (step 1630).

Here, the operation probability may be determined to be different for each of the units.

Here, the operation probability may be dynamically changed according to a distribution state of the resource blocks distributed to the user.

When RAT1 and RAT2 are two primary users, and several users of RAT3 are secondary users, the priority levels of resources borrowed from RAT1 and RAT2 may be approached with the probability of $$\frac{1-\rho_1}{1-\rho_1+1-\rho_2} \text{ and } \frac{1-\rho_2}{1-\rho_1+1-\rho_2}$$

(this may be expressed as a general formula: when $\rho'_I=1-\rho_I$, $\rho'_I=1$). When the secondary users have their own resources, $\rho'_I=1$.

In addition, $C_I-E_I^\gamma$, $L_I-E_I^\gamma$, and $1-Q_I^\gamma$ may be used as probabilities for selecting the respective resources. Here, $C_I$ is the number of entire resources owned by the primary user l, $L_I$ is the number of resources borrowed from the primary user l. $E_I^\gamma$ is an expectation value of the number of resources to be requested to be retrieved by the primary user l, and $Q_I^\gamma$ is the probability that the primary user l will request retrieval of the lent resources.

When these are applied to the two RATS, namely, RAT1 and RAT2, the resources of RAT1 may be selected with the probability of $(C_1-E_1^\gamma)/(C_1-E_1^\gamma+C_2-E_2^\gamma)$ and the resources of RAT2 may be selected with the probability of $(C_2-E_2^\gamma)/(C_1-E_1^\gamma+C_2-E_2^\gamma)$, by employing $C_1-E_1^\gamma$ and $C_2-E_2^\gamma$ In addition, the resources of RAT1 may be selected with the probability of $(L_1-E_1^\gamma)/(L_1-E_1^\gamma+L_2-E_2^\gamma)$ and the resources of RAT2 may be selected with the probability of $(L_2-E_2^\gamma)/(L_1-E_1^\gamma+L_2-E_2^\gamma)$, by employing $L_1-E_1^\gamma$ and $L_2-E_2^\gamma$.

In addition, the resources of RAT1 may be selected with the probability of $(1-Q_1^\gamma)/(1-Q_1^\gamma+1-Q_2^\gamma)$ and the resources of RAT2 may be selected with the probability of $(1-Q_2^\gamma)/(1-Q_1^\gamma+1-Q_2^\gamma)$, by employing $1-Q_1^\gamma$ and $1-Q_2^\gamma$.

In addition, resources borrowed from the primary users such as RAT1 and RAT2 may be selected at random (or stochastically) according to the amount of resources remaining after the resources are used. Namely, when $I_1=L_1-o_1$ and $I_2=L_2-o_2$, wherein $o_1$ and $o_2$ are the number of remaining resources after RAT3 uses resources or the number of remaining resources after RAT3 uses resources and which have remained intact among the resources retrieved by RAT1 and RAT2, the resources borrowed from RAT1 may be selected with the probability of $I_1/(I_1+I_2)$ and the resources borrowed from RAT2 may be selected with the probability of $I_2/(I_1+I_2)$. When this is expressed as a general term, the probability of selecting the resources borrowed from RAT l will be l/Σl.

In addition, the borrowed resources may be selected at random according to the number of borrowed resources. Namely, the borrowed resources may be selected with $L_i/\Sigma L_i$. Of course, when the secondary user has its own resources, the secondary user may preferentially use its resource with the probability of 1, and the resources borrowed from the primary user are allocated at random.

The method employing various probabilities as described above can reduce spectrum handoff compared with the method for simply randomly allocating resources.

Among the methods employing priority, the method of allocating priority levels by units is the most predominant, and among the stochastic (probability, random) methods, $L_I-E_I^\gamma$ and $1-Q_I^\gamma$ are relatively predominant. However, other methods exhibit better performance occasionally in various special situations. For example, the other methods show better performance occasionally when the secondary user borrows a larger amount of resources than the value of $E_I^\gamma$ of the primary user, when the load of the secondary user is too high or too low, or when there is a big difference between the loads of the primary users.

As set forth above, in the method for allocating priority to resource, and the method and apparatus for operating resource using the same. According to exemplary embodiments of the invention, when a system uses two or more types of resources having different characteristics, a priority level is given to each resource and resources are provided according to their priority levels. Thus, when the system faces a situation in which the system cannot use some of resources operated by it due to a certain event, the case in which the system moves to different resources in order to continue a service that uses the corresponding resources can be minimized.

In particular, because priority is determined according to resource characteristics, resources of higher priority levels can be more frequently used and better resources can be more frequently used to thus improve system performance.

As a result, the case in which the service is continued with other resources can be minimized and resources of higher priority levels can be more used. Namely, because the resource of higher priority levels are used, the performance and efficiency can be improved and the case in which the user may turn to outer resources can be minimized.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for allocating priority to resources, the method comprising:
    selecting a resource block including at least one unit;

determining a priority level of the selected resource block by reflecting a retrieval rate including a retrieval frequency and a retrieval period of the selected resource block; and allotting the determined priority level to the selected resource block.

2. The method of claim 1, wherein the resource block is a spectrum block of radio communication.

3. The method of claim 1, wherein the priority level is dynamically changed.

4. The method of claim 1, wherein, in determining the priority level of the selected resource block, each of a plurality of units constituting the selected resource block has a different priority level.

5. The method of claim 4, wherein the priority level determined for each unit is determined by reflecting an expectation value of a retrieval rate of the selected resource block.

6. The method of claim 1, wherein, in determining the priority level to the resource block, the priority level is determined by reflecting at least one of an expectation value of a retrieval rate of the selected resource block and the probability that retrieval of the selected resource block will be requested.

7. A method for operating resources, the method comprising:

selecting a resource block including at least one unit, determining a priority level of the selected resource block by reflecting a retrieval rate including a retrieval frequency and a retrieval period of the selected resource block, and allotting the determined priority level to the selected resource block, thereby allocating the priority level to the resource block;

distributing the priority level-allocated resource block to a service which is to use the resource block; and retrieving the resource block which has been distributed to the service.

8. The method of claim 7, wherein, in allocating the priority level of the selected resource block, each of a plurality of units constituting the selected resource block has a different priority level.

9. The method of claim 8, wherein the priority level determined for each unit is determined by reflecting an expectation value of a retrieval rate of the selected resource block.

10. The method of claim 7, wherein, in allocating the priority level to the resource block, the priority level is allotted by reflecting at least one of an expectation value of a retrieval rate of the selected resource block, the probability that retrieval of the selected resource block will be requested, the amount of resource blocks remaining unused among the selected resource blocks which have been used, and the number of the selected resource blocks.

11. The method of claim 7, wherein, in distributing the priority level-allocated resource blocks to a service which is to use the resource blocks, the resource blocks are distributed according to the QoS (Quality of Service) of the service.

12. The method of claim 7, wherein, in retrieving the resource blocks distributed to the service, when a requested retrieval amount of resource blocks is smaller than the amount of unused resources, the unused resources are retrieved, and when the requested retrieval amount of resource blocks is greater than the amount of unused resources, the unused resources are retrieved, resource corresponding to the difference between the requested retrieval amount of the resource blocks and the unused resources are handed off, and a service of resource that cannot be handed off is dropped.

13. The method of claim 12, wherein, in retrieving the resource blocks distributed to the service, resources used by the service are handed off starting from a service of a low priority level to a service of a high priority level, and a service which is using resource that cannot be handed off is dropped.

14. An apparatus for operating resources, the apparatus comprising:

a plurality of resource blocks including at least one unit;

a plurality of services to use the plurality of resource blocks;

a priority allocation unit determining a priority level of each of the resource blocks by reflecting a retrieval frequency and a retrieval period of each of the resource blocks and allotting the determined priority level to selected resource blocks, to thus allocate the priority level to the resource blocks; and a scheduler distributing the priority level-allocated resource blocks to the services and retrieving the priority level-allocated resource blocks from the services.

15. The apparatus of claim 14, wherein the scheduler distributes the priority level-allocated resource blocks to the services and retrieve the priority level-allocated resource blocks from the services, according to the priority levels of the resource blocks.

16. The apparatus of claim 14, wherein the scheduler distributes the priority level-allocated resource blocks to the services and retrieve the priority level-allocated resource blocks from the services, according to the QoS of the services.

17. The apparatus of claim 14, wherein, in retrieving the resource blocks distributed to the services, when a requested retrieval amount of resource blocks is smaller than the amount of unused resources, the scheduler may retrieve the unused resources, and when the requested retrieval amount of resource blocks is greater than the amount of unused resources, the scheduler may retrieve the unused resources, and the scheduler may hand off resource corresponding to the difference between the requested retrieval amount of the resource blocks and the unused resources and drop a service of resource that cannot be handed off.

* * * * *